United States Patent [19]
Smedley et al.

[11] 3,794,277
[45] Feb. 26, 1974

[54] EARTHQUAKE RESISTANT SUPPORT

[76] Inventors: Paul A. Smedley, 3780 Canfield Rd., Pasadena, Calif. 91107; Anderson B. Smedley, 834 Linda Vista Ave., Pasadena, Calif. 91103

[22] Filed: Aug. 14, 1972

[21] Appl. No.: 280,129

[52] U.S. Cl.............. 248/20, 52/167, 248/358 R
[51] Int. Cl.............................................. F16f 15/00
[58] Field of Search........248/358 R, 19, 20, 21; 52/167, 98, 99; 188/13

[56] References Cited
UNITED STATES PATENTS

| | | | |
|---|---|---|---|
| 3,249,330 | 5/1966 | Preis | 248/358 R |
| 3,308,584 | 3/1967 | Graham | 52/98 |
| 3,572,621 | 9/1968 | Whitten | 248/20 |
| 789,732 | 5/1905 | Hinton | 52/98 |
| 3,459,395 | 8/1969 | Scotto | 248/20 |

FOREIGN PATENTS OR APPLICATIONS

| | | | |
|---|---|---|---|
| 1,100,123 | 1/1968 | Great Britain | 248/20 |

*Primary Examiner*—J. Franklin Foss
*Attorney, Agent, or Firm*—Donald D. Mon

[57] ABSTRACT

An earthquake resistant support structure which comprises two types of supporting members: a frangible, substantially incompressible and rigid primary support structure and a secondary support structure which is resilient. The primary support structure supports the weight of the apparatus to be protected, until the event of an earthquake of sufficient magnitude, then the primary support structure will fail, whereupon the secondary support structure takes the load. The latter resiliently yields to protect the apparatus from earthquake damage by decoupling the apparatus from the ground. Shock absorbers may be provided to damp oscillations induced in the system.

17 Claims, 10 Drawing Figures

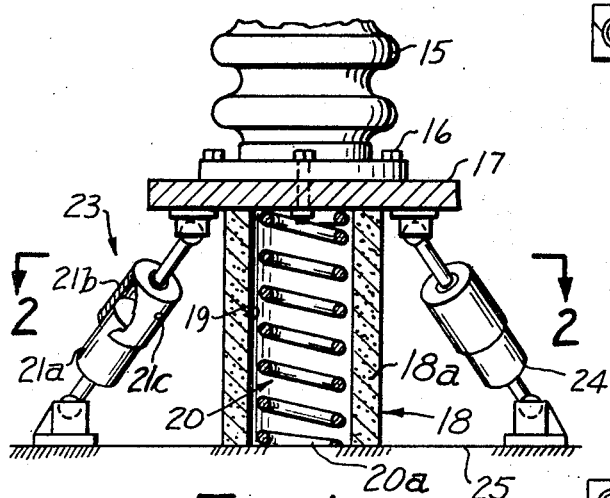
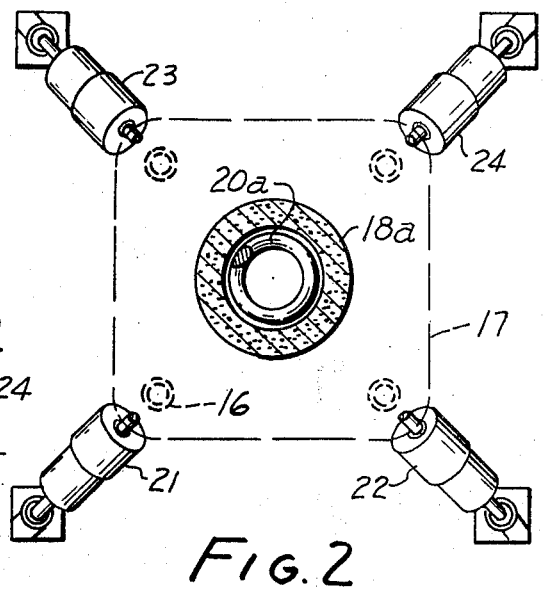
FIG.1  FIG.2
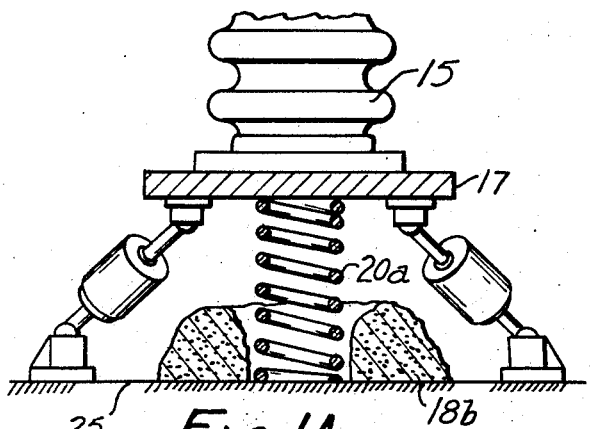
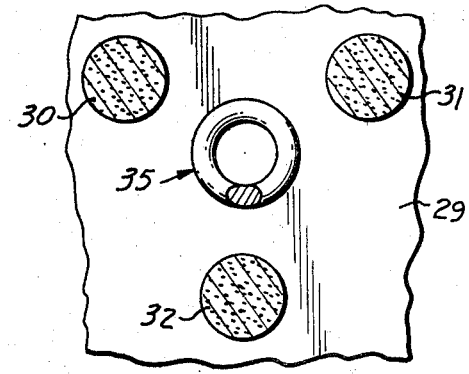
FIG.1A  FIG.4
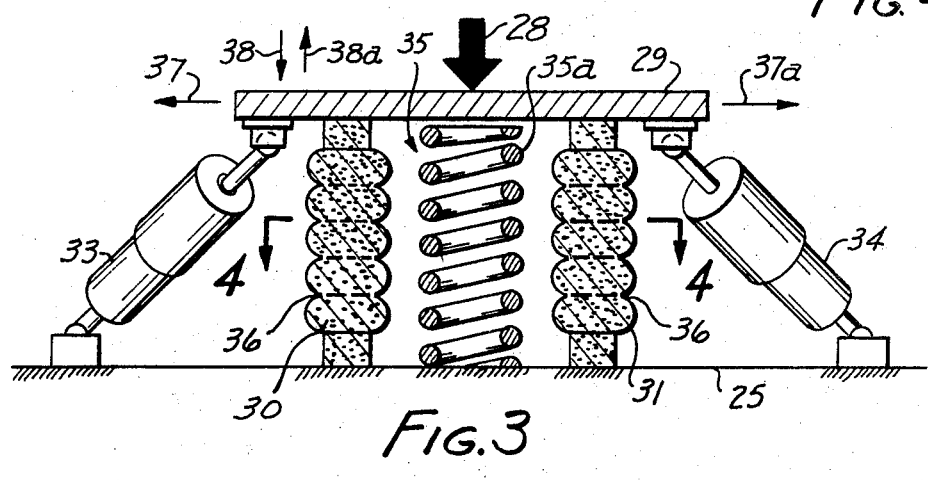
FIG.3

EARTHQUAKE RESISTANT SUPPORT

DESCRIPTION OF THE INVENTION

This invention deals with an apparatus for supporting structures, such as electrical distribution switchyard equipment, or sensitive instruments, by means of a rigid, but frangible, primary structure for supporting the load under normal conditions, and secondary support structure which is resilient and will support the load after an earthquake shock breaks the primary support structure.

An object of this invention is to provide a solid, substantially incompressible and rigid, primary support structure for supporting apparatus (or any other type of static load) under normal circumstances, and which will break under earthquake loads to allow a resilient secondary support structure to assume the support function. Until an earthquake occurs of sufficient magnitude which is nearly, but not quite enough to damage the supported apparatus, the apparatus will be normally and firmly supported on the ground by the primary support structure, and the resilient support will be ineffective until and unless such an event occurs.

Yet another object of this invention is to provide secondary support structure which will decouple supported apparatus from earthquake shocks after the primary support structure is destroyed.

Still another object of this invention is to provide shock absorber means, auxiliary to the primary and secondary support structures for damping oscillations which may be induced by earthquake forces when the apparatus is supported only by the secondary support structure.

Every major earthquake leaves behind it considerable damage to large rigid structures (sometimes called "apparatus"), such as electrical distribution switchyard equipment, water tanks, instrumentation, and the like. The problem is that such structures are made rigid within themselves to provide structural integrity, and are rigidly mounted to the ground by a foundation. Then, when a strong earth shock occurs, they quickly begin to oscillate at their resonant frequency and destroy themselves within a few seconds.

These apparati must, by their very nature, be firmly and rigidly mounted during normal circumstances, i.e., in the absence of major earthquakes. However, this arrangement is often fatal to the supported apparatus upon the event of an earthquake, because, during the shocks, the apparatus is coupled to the ground, and damage results. It is an object of this invention to provide a rigid mounting for the apparatus, but in a frangible form which will be destroyed by an earthquake. Secondary resilient support means is provided which will then assume the load, but which will decouple the apparatus from the ground motion, thereby preventing the supported apparatus from oscillating at its resonant frequency and destroying itself. After the earthquake, the structure may have sagged or moved somewhat, on the resilient secondary support structure, because it is no longer rigidly supported and it definitely is not properly supported for longterm service, but at least it will still be in existence, and the rigid primary support means may be rebuilt to resume the primary support function.

In addition, to reduce the likelihood of upsetting of the apparatus due to excessive shock or over-deflection of the resilient secondary support members, and to damp any oscillations which might develop during earthquake, shock absorbers may be placed between the ground and the supported apparatus which become effective when the apparatus is supported by the secondary support means.

A support system according to this invention includes rigid, primary support means for supporting apparatus under normal conditions, which are breakable by earthquake loads, and resilient secondary support means for resiliently supporting the apparatus after the primary support means has broken, thereby decoupling it from the ground while earthquake loads are occurring.

The invention will be fully understood from the following detailed description and the accompanying drawings in which:

FIG. 1 is a partial side elevation of the preferred embodiment of the invention, shown partially in cross-section, in its repose condition prior to an earthquake;

FIG. 1a is a fragmentary side view, partially in axial cross-section, of the embodiment of FIG. 1 during and after an earthquake;

FIG. 2 is a composite view, principally in cross-section, taken at line 2—2 of FIG. 1;

FIG. 3 is an axial cross-section of another embodiment of the invention;

FIG. 4 is a fragmentary cross-section taken at line 4—4 of FIG. 3; and

Figure 5:
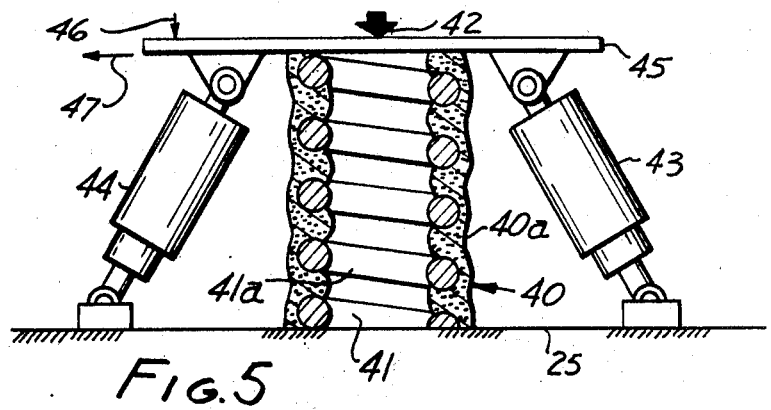
FIGS. 5–9 are axial cross-sections of other embodiments of the invention.

In FIGS. 1, 1a and 2, there is shown the presently preferred embodiment of the invention wherein apparatus 15 (sometimes called "structure" or a "load"), such as an electrical insulator stack, is fastened by bolts 16 to a base 17. The base may be a separate plate, as shown, or instead may be an integral part of the supported apparatus. In normal usage, base 17 rests upon a rigid primary support means 18 (sometimes called "primary support means") in the form of a hollow concrete cylinder 18a. The primary support means takes the static load of the apparatus and supports the apparatus above the ground.

A bore 19 in the concrete cylinder member 18a houses a resilient secondary support means 20; in this example means 20 comprises a helical compression spring member 20a coaxial with member 18a. Spring 20a will usually have a free uncompressed length longer than the length of concrete cylinder member 18a so that the static load will preload spring member 20a. Alternatively, spring member 20a may be shorter and therefore unloaded in the repose condition, and then it will not not assume any part of the load unless and until an earthquake occurs.

As an optional feature, four shock absorbers 21, 22, 23 and 24 are fastened to base 17 and are anchored to the ground 25. They form an angle with the ground and with base 17 so as to provide lateral restraint in all directions. Their axes in plan view are normal to each other, and, accordingly, they provide damping resistance to side movement in all directions, and to vertical movement as well. They are typically of the telescoping tube type, and are swivelly mounted to the base 17 and to the ground 25 to allow for change in length and relative angle under quake loads. Characteristically, these include a piston 21a, a cylinder 21b, and an orifice 21c, which resists flow of fluid. The damping action is a consequence of the expenditure of energy which occurs when fluid is forced through the orifice. Shock absorbers are well-known and require no further discussion here, except to comment that they tend to damp oscillations in the resilient system.

As can be seen in FIG. 1a, under the shock of earthquake, or other external force of sufficient magnitude, the concrete cylinder member 18, which is frangible, breaks or crumbles, as schematically shown by the pile of detritus 18b. The primary support means simply ceases to exist. It is "frangible," i.e., breakable, meaning that under sufficient load it comes apart and falls away to leave the apparatus supported only by the secondary support means The term "frangible" is therefore a broad term, used in the sense of a structural fracture which destroys the capacity of the primary support means to support a static load.

After the primary support means breaks, the spring will deflect and thereby decouple the apparatus from the shock loads. The shock absorbers, when used (and they are optional) will act to damp oscillations in vertical and horizontal (lateral) directions. They also tend to stabilize the load in an upright position after the shocks have stopped. Clearly, additional stabilization could also be provided by using a plurality of springs, and their number and placement are variables determined by the application.

After the external shock forces have ceased, and the foundation is to be repaired, the debris of the concrete cylinder member is removed, the apparatus jacked up, a new concrete cylinder member 18a placed under the apparatus, and the apparatus lowered onto the new cylinder to restore the equipment to its original state.

In FIG. 3 there is shown another embodiment of the invention. Arrow 28 symbolizes a load applied to base 29 by a supported apparatus. Base 29 is supported by three rigid primary support means 30, 31 and 32. Four shock absorbers, such as exemplified by shock absorbers 33 and 34 in FIG. 3, are placed around base 29 in the same arrangement shown in FIG. 2. Resilient secondary support means 35 in the form of a coil spring 35a is located at the center of load of base 29, as in FIG. 1.

The three primary support means 30, 31 and 32 are solid-core columns which are peripherally weakened by a plurality of parallel annular grooves 36 in their outer surfaces. The three means 30, 31 and 32 are designed so that they will fail in shear or compression (or both) when transverse or compression loads (or both), of large enough magnitude to damage the supported apparatus 28 occur during an earthquake. Upon application of shear loads (exemplified by arrows 37, 37a and compression loads exemplified by arrows 38 and 38a) the means 30, 31 and 32 will fragment at the grooves, and the shock loading will then be assumed by spring 35a, the shock absorbers, when used, damping the action.

In FIG. 5 there is shown still another embodiment of the invention wherein a rigid primary support means 40 in the form of a frangible column 40a is formed adherently to and encapsulating a resilient secondary support means 41 in the form of a compression spring 41a so that the assembly of frangible column 40 and compression spring 41a is essentially incompressible under load 42. Arrow 42 represents this static load applied by the supported apparatus.

Four shock absorbers (exemplified by two shock absorbers 43 and 44), are located at the corners of base 45 as in FIGS. 1 and 2. Under the influence of shock loads of an earthquake, as exemplified by arrows 46 and 47, the frangible column 40a, which may be concrete sprayed onto or molded around the spring, will shatter, leaving the base 45 supported only by spring 41a. Any oscillations wil be damped by the shock absorbers when they are used. To restore the system to its original condition, it is only necessary to clear away the detritus, build a new mold around the spring 41a, and pour in concrete or other suitable materials to create a new solid support column, or to spray it onto the spring.

Figure 6:
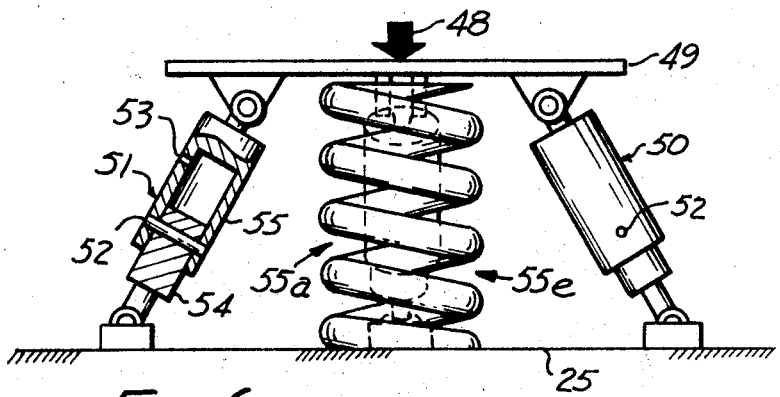

Still another embodiment of the invention is shown in FIG. 6, where an applied load 48 is supported on a base 49. The base is rigidly supported by modified shock absorbers, which as modified act as primary support means. Two exemplary shock absorbers 50, 51 are shown, there being two more like these, the four being placed as the shock absorbers are placed in FIG. 2. These are modified and made initially rigid by a shear pin member 52 which rigidly interconnects the telescoping portions of the shock absorber, and they thereby functionally become the primary support means, the shear pins comprising the frangible portion of the primary support means. Each shock absorber includes a bleed passage 53 which dampens the relative motion of a plunger 54 and a sleeve 55 (the plunger and sleeve being the said telescopic portions), in accordance with known shock absorber principles.

A resilient secondary support means 55e in the form of a compression spring 55a is placed under the center load of base 48. Under the influence of a normal static loads, the modified shock absorbers remain as rigid structural members. An overload force such as generated by an earthquake will shear the shear pin members 52, releasing the shock absorber members to act in their ordinary capacity. The apparatus on base 49 wil be carried by the secondary support means 55e as in the previous embodiments.

Figure 7:
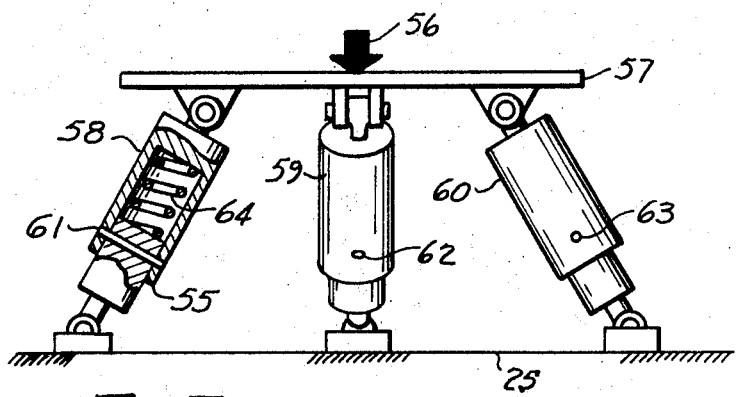

Still another embodiment of the invention is shown in FIG. 7 wherein the applied apparatus load 56 is supported by base 57 and by a plurality of modified shock absorbers 58, 59, 60 as in FIG. 6, arranged as in FIG. 2 (there are four, only three being shown in the FIGS.). The distinction between the devices of FIGS. 6 and 7 is that the shock absorbers incorporate both the primary and secondary support means. Shear pin members 61, 62 and 63 hold the parts of the shock absorbers rigidly together to function as primary support means until a sufficient dynamic load is exerted to shear the pins. Secondary support means, exemplified by spring 64 are placed in the shock absorbers. When the shear pins are sheared, springs 64 resiliently support the load. The telescoping portions of the shock absorbers are common to both the primary and to the secondary support means.

After the shear pin members 61, 62 and 63 shear, the shock absorbers, when used, are free to act in their normal manner If damping is not desired, the ports in the shock absorber may be opened to such a size as not to dissipate substantial energy. After the quake the base can be jacked up, and new shear pins inserted in the embodiments of FIGS. 6 and 7.

Figure 8:
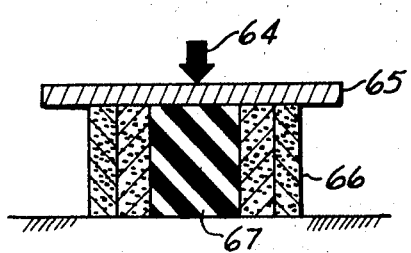

Still another embodiment of the invention is shown in FIG. 8, where the applied load 64 is supported by a base 65. Base 65 is in turn supported by a frangible tubular column 66 as in FIG. 1. Instead of a coil spring, the secondary support means 67 comprises an elastomeric support member 67 which is located concentrically, and extends coaxially within the column 66. Under external shock loads which exceed the compressive strength of the supporting frangible tubular column 66, but at a load level lower than that which would damage the apparatus represented by load 64, the frangible column 66 will be destroyed, and the apparatus load 64 will be supported by the elastomeric member 67, which is sufficiently resilient to decouple the apparatus from the ground. To repair the device after an earthquake, the cylindrical support column 66 will be replaced by jacking up the base 65 and placing a new preformed column 66, with elastomeric member 67 contained within underneath the base.

Figure 9:
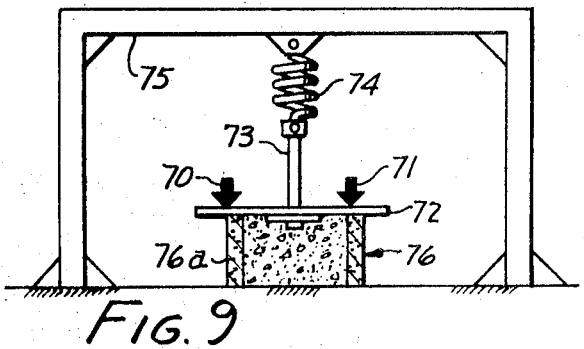

FIG. 9 shows yet another embodiment of the invention. The apparatus load is represented by arrows 70 and 71. It is supported on a base 72. This base is in turn supported by a rod member 73, which hangs from a spring member 74, attached to a scaffold structure 75. This spring member constitutes a resilient secondary support means. The static load is carried by primary support means 76, comprising a tubular concrete column 76a. Under the impact of a shock load due to earthquake, or other external force, the frangible tubular column 76a will be destroyed, and the apparatus load will be carried through rod member 73 and spring member 74 to the scaffold support member 75. The spring will dampen the dynamic loads applied to the suspended apparatus and prevent damage to it. After the earthquake, the destroyed frangible tubular column 76 may be replaced by jacking up base 72.

Thus, it can be seen, in all embodiments of this invention, that a means is provided for protecting apparatus from the effects of external shocks by initially statically supporting it upon a primary rigid support member that will break at a load level that is lower than that which will damage the apparatus. Upon exertion of an overload, such as would occur in an earthquake or explosion, the rigid primary support member fails, allowing a resilient secondary support member, such as a compression spring or an elastomeric support member, to take over both the static and dynamic load while, if desired auxiliary shock absorbers, or springs, damp the shocks.

In one embodiment, the secondary means for secondary support after the frangible primary support member has failed is of an elastomeric compound, and in two instances, the frangible members take the form of shear pins incorporated into telescopic structures, to make the shock absorbers initially rigid, and sequentially convert into resilient members. These are variations of the various support means, all of which fall within the invention's concept. It is evident that there will be sufficient freedom for movement at the points of attachment of the shock absorbers, or other means which interconnect the base with the ground, to permit vertical and horizontal motion in all vertical and horizontal directions when the primary support means has been fractured, and also that the primary support means will give support in all vertical and horizontal directions until force sufficient to break it has been applied.

There are numerous materials which can be used for the primary support means Concrete is one of the most broadly useful substances, and its strength and frangibility can be established by selection of appropriate dimensions and formulations. The shear pins and other means may be selected by reference to their respective properties and the anticipated loads.

Sometimes the term "ground" is used to describe the point of attachment of the support means. Of course, this term is intended to connote the earth, or structure rigidly connected to it, such as a foundation or other support.

The invention is not to be limited by the embodiments shown in the drawings and described in the description, which are given by way of example and not of limitation, but only in accordance with the scope of the appended claims.

We claim:

1. A support system for supporting apparatus relative to the ground comprising:
   a. primary support means, said primary support means being made of substantially rigid and imcompressible material, and adapted to fail physically upon the imposition of sufficient external shock loads lesser in magnitude than those which would substantially damage said apparatus; and
   b. resilient secondary support means, said secondary support means adapted to support said apparatus absent the primary support means, said primary and secondary support means providing respective rigid and resilient support in all vertical and horizontal directions and combinations thereof when they function as support means, the primary support means failing as a consequence of sufficient forces exerted in any horizontal or vertical direction or combination thereof.

2. A support system according to claim 1 in which said primary support means is a hollow cylinder member, said hollow cylinder member being adapted to crumble under application of said external shock loads before said apparatus can be damaged by them, said hollow cylinder member being adapted to support said apparatus under normal static conditions.

3. A support system according to claim 1 in which a plurality of shock absorber means is provided, each of said shock absorber means being mounted between said apparatus and ground, said individual shock absorber means extending obliquely relative to the horizontal and to the vertical.

4. A support system according to claim 2 in which said secondary support means comprises a helical compression spring member, said helical compression spring member being coaxial with said hollow cylinder member.

5. A support system according to claim 2 in which said hollow cylinder member is made of concrete.

6. A support system according to claim 1 in which said primary support means comprises a plurality of column members.

7. A support system according to claim 6 in which said column members have external grooves, said external grooves being adapted to weaken said column members.

8. A support system according to claim 6 in which said column members are made of concrete.

9. A support system according to claim 6 in which a plurality of shock absorber means is provided, each of said shcok absorber means being mounted between said apparatus and ground, said individual shock absorber means extending obliquely relative to the horizontal and to the vertical.

10. A support system according to claim 6 in which said secondary support means comprises a helical compression spring member, said helical compression spring member being coaxial with said hollow cylinder.

11. A support system according to claim 1 in which said secondary support means comprises a compression spring member, said compression spring member being adapted to be in contact with said apparatus and with the ground in the absence of support by the primary support means, and in which said primary support means is cast integrally with said compression spring member.

12. A support system according to claim 11 in which a plurality of shock absorber means is provided, each of said shock absorber means being mounted between said apparatus and ground, said individual shock absorber means extending obliquely relative to the horizontal and to the vertical.

13. A support system according to claim 11 in which said primary support means is made of concrete.

14. A support system according to claim 1, in which said primary support means comprises a pair of telescoping members, and a shear pin rigidly interconnecting the same, said shear pin members installed transversely through said telescoping being and being adapted to support said apparatus until shock loads fail said shear pin.

15. A support system according to claim 14 in which the secondary support means comprises a spring interposed between said telescoping members.

16. A support system for providing support for apparatus relative to the ground, comprising:
  a. primary support means comprising a frangible member, made of substantially rigid and incompressible material and adapted to fail physically upon the imposition of sufficient external shock loads lesser in magnitude than those which would substantially damage said apparatus; and
  b. an elastomeric secondary support means, resting on the ground beneath the apparatus adapted to support the apparatus after the primary support means fails, and to decouple the apparatus from earthquake forces, said primary and secondary support means providing respective rigid and resilient support in all vertical and horizontal directions and combinations thereof when they function as support means, the primary support means failing as a consequence of sufficient forces exerted in any horizontal or vertical direction of combination thereof.

17. A support system for supporting apparatus from the ground, comprising:
  a. a rigid primary support means comprising a frangible tubular member, said tubular member resting on the ground and extending vertically, said rigid primary support means being made of substantially rigid and incompressible material, and adapted to fail physically upon the imposition of sufficient external shock loads lesser in magnitude than those which would substantially damage said apparatus;
  b. a scaffold means, said scaffold means having an elevated cross-member, said elevated cross-member adapted to overhang the apparatus; and
  c. secondary support means, comprising a resilient tension spring hung from said elevated cross-member over said apparatus, said tension spring adapted to be attached to said apparatus for supporting and decoupling it from earthquake forces, said primary and secondary support means providing respective rigid and resilient support in all vertical and horizontal directions and combinations thereof when they function as support means, the primary support means failing as a consequence of sufficient forces exerted in any horizontal or vertical direction or combinations thereof.

* * * * *

PO-1050
(5/69)

UNITED STATES PATENT OFFICE
CERTIFICATE OF CORRECTION

Patent No. 3,794,277                    Dated   February 26, 1974

Inventor(s)  PAUL A. SMEDLEY and ANDERSON B. SMEDLEY

It is certified that error appears in the above-identified patent and that said Letters Patent are hereby corrected as shown below:

| | |
|---|---|
| Col. 1, line 58 | "structure" should read --apparatus-- |
| Col. 2, line 2 | "earthquake" should read --earthquakes-- |
| Col. 2, line 52 | cancel "not" second occurrence |
| Col. 3, line 7 | "18" should read --18a-- |
| Col. 4, line 6 | "wil" should read --will-- |
| Col. 5, line 65 | after "means" insert a period |
| Col. 7, line 24 | "members" should read --being-- |
| Col. 7, line 25 | "being" first occurrence, should read --members-- |

Signed and sealed this 29th day of April 1975.

(SEAL)
Attest:

RUTH C. MASON
Attesting Officer

C. MARSHALL DANN
Commissioner of Patents
and Trademarks